United States Patent [19]
Buday

[11] Patent Number: 5,240,124
[45] Date of Patent: Aug. 31, 1993

[54] STORAGE CART

[75] Inventor: Gene Buday, Laguna Niguel, Calif.

[73] Assignee: Proprocess Corporation, Paramount, Calif.

[21] Appl. No.: 903,930

[22] Filed: Jun. 26, 1992

[51] Int. Cl.$^5$ .............................................. A47F 5/00
[52] U.S. Cl. ................................... 211/59.2; 211/181
[58] Field of Search ............... 211/59.2, 181, 126; 312/42, 45, 72; 280/79.3

[56] References Cited

U.S. PATENT DOCUMENTS

| | | | |
|---|---|---|---|
| 2,905,330 | 9/1959 | Lilja | 211/59.2 |
| 3,203,553 | 8/1965 | Pendergrast et al. | 211/59.2 |
| 3,225,939 | 12/1965 | Braun | 211/181 X |
| 3,232,442 | 2/1966 | Wilson | 211/181 X |
| 4,067,265 | 1/1978 | Watson | 280/79.3 X |
| 4,191,296 | 3/1980 | Morgan | 211/59.2 |
| 4,732,282 | 3/1988 | Lockwood | 211/59.2 |
| 4,793,497 | 12/1988 | Hall et al. | 280/79.3 X |
| 5,123,545 | 6/1992 | Hickman | 211/59.2 |

OTHER PUBLICATIONS

Rack n Roll, Dispense-A-Can Racks, Crescent metal products, Inc., Cleveland, Ohio.

Primary Examiner—Robert W. Gibson, Jr.
Attorney, Agent, or Firm—Stetina and Brunda

[57] ABSTRACT

A storage rack for storing and sequentially dispensing containers is disclosed. The storage rack comprises a base support having a length extending from a rear container receiving port to a front container receiving port. First and second side guides are provided extending substantially the length of the base support member on opposite sides thereof, the side guides being vertically spaced from the base support member by a distance less than the height of the containers. A top guide is provided extending a portion of the length of the base support member. The top guide is vertically offset from the base support member by a distance greater than the height of the container when the container lies flat upon the base support member, but less than the height of the container when the container is tilted upward from the base support member. A front stop bar is disposed adjacent the container dispensing port, transverse to the base support member and vertically spaced therefrom.

4 Claims, 2 Drawing Sheets

STORAGE CART

BACKGROUND OF THE INVENTION

The present invention relates to storage carts, and more particularly, carts having multiple tiers of racks for storing and dispensing products.

Portable storage racks are useful to store and facilitate dispensing of a variety of different types of products. Typically, such storage racks are formed of open aluminum frames having a number of shelves which each may store various types of products, such as cans, containers or other packages. Some contemporary storage racks include angled shelves, which act to urge the cans or packages on the shelves towards a dispensing location. For example, the angled shelves may be used to urge cans stored on the shelves to roll towards a dispensing position along one edge of the cart. Though such devices are suitable to facilitate dispensing some product such as large cans, they do not adequately facilitate dispensing other types of products which may not easily move toward the dispensing location. For example, packages of dough or baked goods will not typically roll towards a dispensing location. Therefore, the storage cart must be formed to urge the packages to slide without rolling. However, the sliding action of the packages may cause the adjacent packages to tilt up when they abut against each other. This in turn, may knock the lids off of the packages or otherwise cock the packages to interfere in the sliding action of the packages toward the dispensing location.

The storage cart of the present invention provides a construction which facilitates sliding movement of the packages towards a dispensing location, while opposing any upward tilt of the packages as a consequence of abutting against each other.

SUMMARY OF THE INVENTION

A storage rack for storing and sequentially dispensing containers is disclosed. The storage rack comprises a base support having a length extending from a rear container receiving port to a front container receiving port. First and second side guides are provided extending substantially the length of the base support member on opposite sides thereof, the side guides being vertically spaced from the base support member by a distance less than the height of the containers. A top guide is provided extending a portion of the length of the base support member. The top guide is vertically offset from the base support member by a distance greater than the height of the container when the container lies flat upon the base support member, but less than the height of the container when the container is tilted upward from the base support member. A front stop bar is disposed adjacent the container dispensing port, transverse to the base support member and vertically spaced therefrom.

The top guide is formed to have a length sufficiently less than the length of the rack to allow only one container to tilt upward for discharge from the rack.

In the presently preferred embodiment the base support member and side guides are formed of wire rods.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the structure and operation of the invention in connection with the illustrated embodiments. It is understood, however, that the same or equivalent functions and advantages may be accomplished by different embodiments that are also intended to be encompassed within the spirit and scope of the invention.

Figure 1:
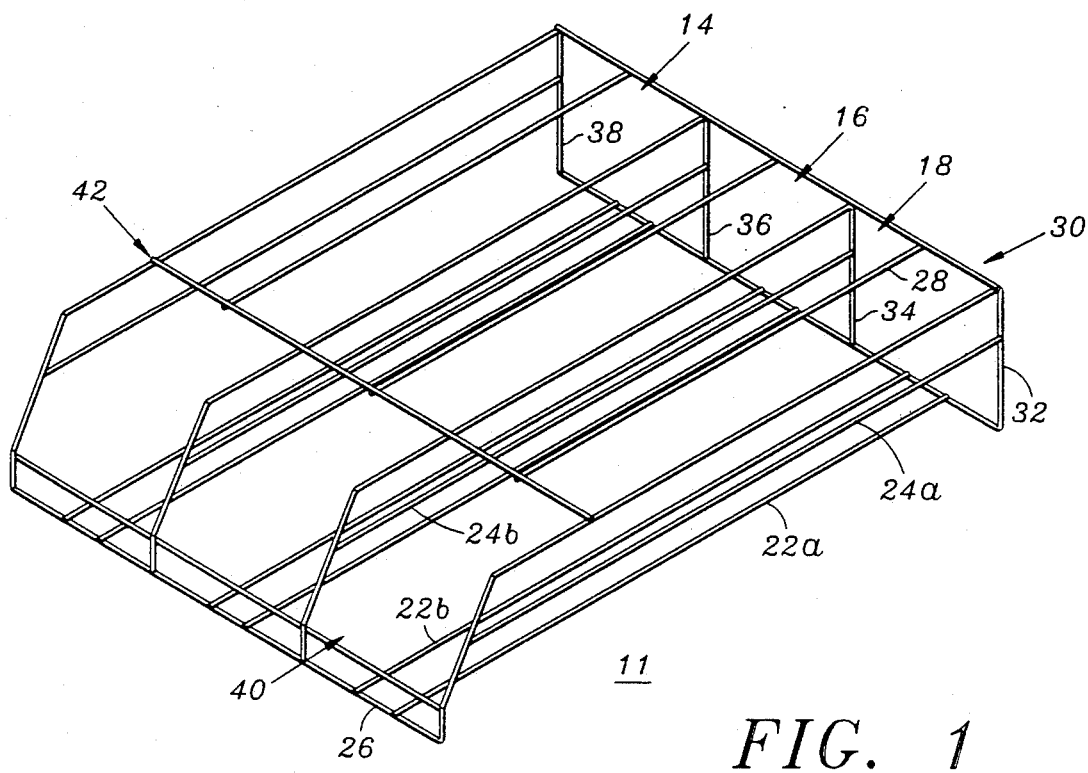
FIG. 1 is a perspective view showing of a storage cart rack formed in accordance with the present invention.

Referring to FIG. 1, an exemplary storage rack 11 is shown therein. The rack includes three chutes or sections 14, 16, 18, each of which includes a base portion formed of base supports 22a, 22b, a pair of side guides, such as side guide members 24a, 24b, a front stop guide 26 and a top guide 28. Each chute has an open rear container receiving port 30 for receiving the containers to be dispensed at the front container dispensing port 40. Top guide 28 extends along the length of each chute from receiving port 30 to rib member 42. The top guide 28 terminates sufficiently before dispensing port 40 such that products sliding along the base supports 22a, 22b may be withdrawn from the front end portion 40, but will not otherwise tilt within the chutes.

In practice, containers to be dispensed are inserted in the rack 11 from the rear receiving port 30, slide forward along the length of the rack, and are removed from the front dispensing port 40. The rack is formed such that the height of the rack, as represented by vertical support members 32, 34, 36, 38 is formed in accordance with the size of the containers to be dispensed. More particularly, the height of the rack is formed such that the top guide members 28 prevent the containers from tipping over as they slide forward along the base supports 22a, 22b. For example, the height of the rack may be formed to be a little less than the largest diameter of the containers therein.

Cross member 42 extends along the width of the storage rack 11 and defines the end of top guide 28. The location of cross member 42 is preferably selected such that the lid of the forwardmost container within the rack 11 extends at least partially rearward of cross member 42. This prevents the forwardmost container from tipping forward and being unintentionally discharged from the storage rack 11. However, as described in connection with FIG. 5, containers can readily be removed from the storage rack 11 by lifting up the forward portion of the container, so that the bottom of the container extends above front stop guide 26, and then extracting the forwardmost container from the rack 11. Containers behind the forwardmost container will then slide forward with the next succeeding container being stopped by a abutment against front stop guide 26. As described below, multiple racks may be preferably disposed within a storage cart with each rack disposed at an angle in order to facilitate dispensing the containers within the rack.

Figure 2:
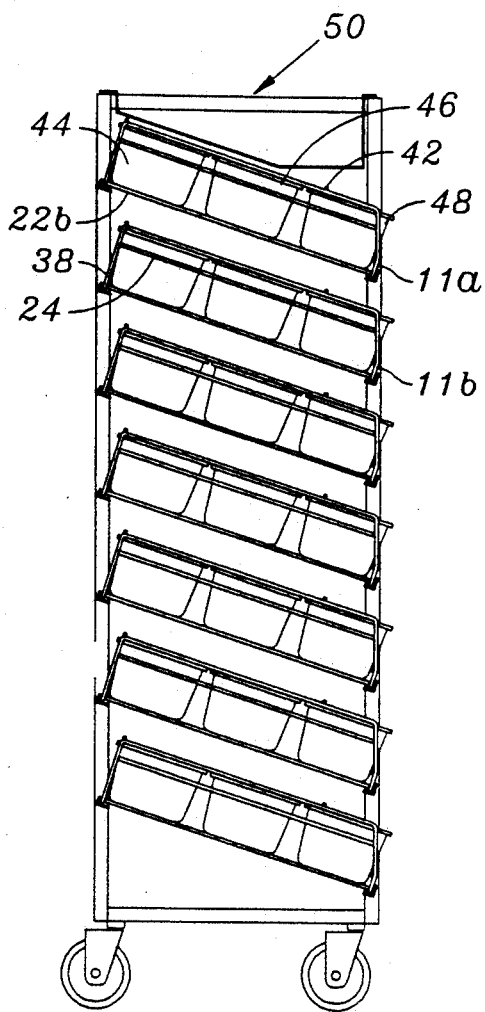
FIG. 2 is a side view of a plurality of the racks shown in FIG. 1 arrayed on a storage cart.
Figure 3:
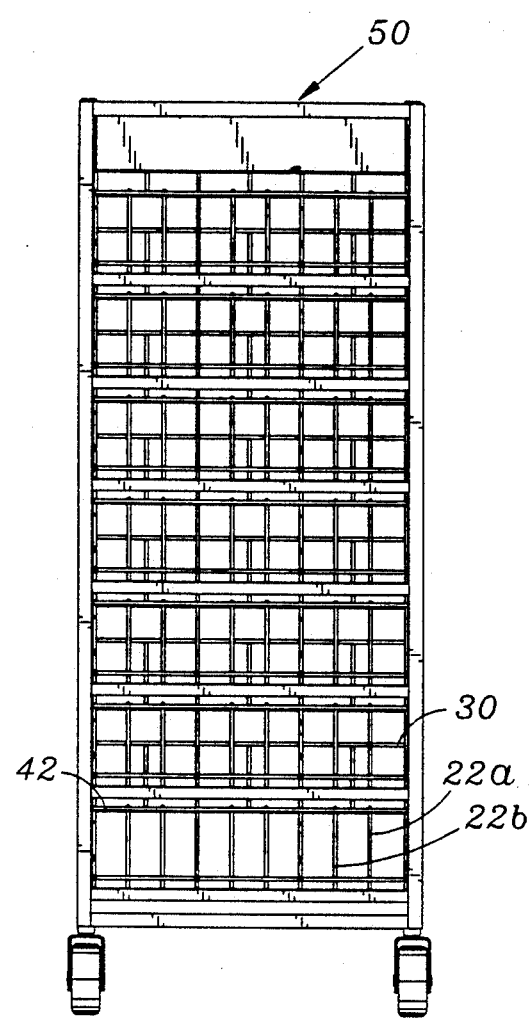
FIG. 3 is a front view of the storage cart shown in FIG. 2.

FIG. 2 illustrates a side view of a multi-rack storage cart 50 formed in accordance with the present invention. FIG. 3 is a front view of the same rack, with the containers removed.

As shown in FIGS. 2 and 3, each of the racks, e.g., 11a, 11b, are received within and supported by the cart 50, with the racks each disposed at an angle on the cart 50 in order to urge the containers towards the front dispensing port 40. As can be seen from FIG. 2, exemplary containers 42, 44, 46 are urged to travel within the rack 11 by virtue of the downward inclination of the rack 11 on the cart 50. However, unless means are provided to maintain the containers 42, 44, 46 in the proper orientation, the downward inclination of the racks 11a, 11b may result in tipping over the containers and interfering with the sliding of the containers within the racks 11a, 11b. By use of the side guides 24a, 24b, and the top guide 28, the containers are maintained within the rack in the desired orientation, thereby facilitating passage of the containers through the racks 11a, 11b.

Figure 4:
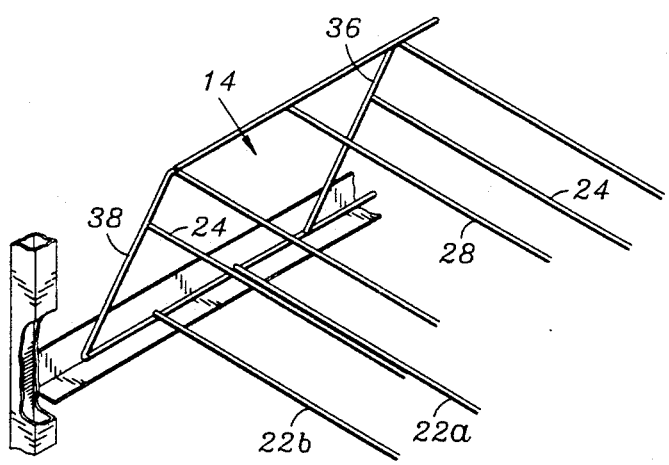
FIG. 4 is a perspective view showing the structure by which the racks are supported on the storage cart.

FIG. 4 illustrates the construction of the cart 50 and, in particular, the means provided for supporting the storage racks on the cart 50. As shown in FIG. 4, the storage cart 50 is provided with frame members 54, having a recess which receives and supports the storage racks in an inclined orientation. As will be apparent to those of ordinary skill in the art, the degree of incline can be varied as desired. The degree of inclination may effect the number of racks that may be stored within the cart.

Figure 5:
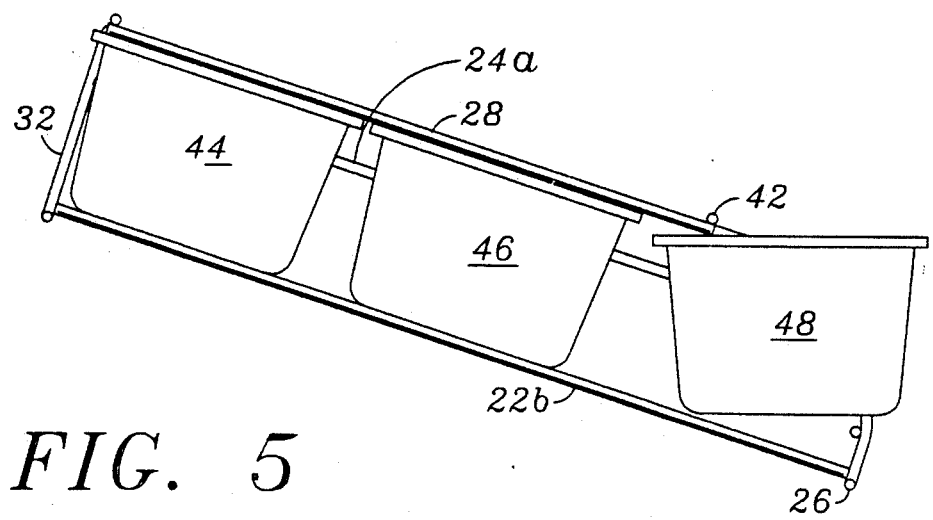
FIG. 5 is a side view illustrating the movement and removal of containers from the rack.

FIG. 5 illustrates in more detail the manner in which the top guide interacts with the containers to retain the lids on the containers and keep the containers from becoming cocked as they traverse through the storage rack 11. As shown in FIG. 5, the top guide 28 is spaced above the height of the container to allow the containers to freely traverse through the storage rack 11. The precise spacing is a matter of design selection. However, the spacing between the containers and the top guide must be too small to allow the containers to tip forward and knock lids off adjacent containers, or otherwise cock the containers to interfere with their free travel through the storage rack 11.

As shown at FIG. 5, the forwardmost container, i.e. container 48, may be withdrawn from the storage rack by tilting forward to elevate the container vertically above front stop guide 26. Thus, the length of top guide 28 and the vertical height of front stop guide 26 should preferably be selected in view of the particular types of containers passing within the storage rack 11, to allow for easy dispensation of containers from the storage rack. For example, the difference in length between the top guide 28 and base supports 22a, 22b should be less than the diameter of round containers. In the case of the containers shown at FIG. 5, the difference in length between top guide 28 and base supports 22a, 22b should be less than the diameter of container lid 58.

As will be apparent to those of ordinary skill in the art, the particular construction of the side guides 24a, 24b and the top guide 28 is a matter of design choice and may be varied without departing from the broader aspects of the invention. Similarly, it is to be understood that the racks 11 may be constructed to have different number or arrangement of chutes other than those disclosed and illustrated herein. Still further, the size and shape of the rack 11 may be varied to accommodate different types of containers that are commonly stored within such racks.

In yet another embodiment, the rack 11 may be formed to incorporate a lower support member that causes the racks to be inclined even when resting on a flat surface. This embodiment will be useful where the rack is used on a flat surface, or where the rack is mounted on a storage cart wherein the rack supports are not vertically offset.

As will be apparent to those of ordinary skill in the art, these and other modifications and enhancements of the invention may be accomplished without departing from the broader novel aspects of the invention.

What is claimed is:

1. A storage rack for storing and sequentially dispensing containers placed therein, the storage rack comprising:
    a base support member having a length extending from a rear container receiving port to a front container dispensing port, said base support member substantially defining the length of the rack;
    first and second side guides extending substantially the length of the base support member on opposite sides thereof, said side guides being vertically spaced from said base support member by a distance less than the height of the containers;
    a top guide extending a portion of the length of the base support member, said top guide being vertically offset from said base support member by a distance greater than the height of the container when the container lies flat upon the base support member, but less than the height of the container when the container is tilted upward from the base support member, said top guide further having a length sufficiently less than the length of the base support member to allow only one container to tilt upward for discharge from the rack; and
    a front stop bar disposed adjacent said container dispensing port, transverse to said base support member and vertically spaced therefrom.

2. The storage rack as recited in claim 1 wherein the base support member comprises a plurality of wire rods.

3. A portable storage cart comprising:
    a tubular frame; and
    a plurality of storage racks removably disposed in a vertically inclined orientation within the tubular fame, each rack including:
    a base support member having a length extending from a rear container receiving port to a front container dispensing port, said base support member substantially defining the length of the rack;
    first and sceond side guides extending substantially the length of the base support member on opposite sides thereof, said side guides being vertically spaced from said base support member by a distance less than the height of the containers;
    a top guide extending a portion of the length of the base support member, said top guide being vertically offset from said base support member by a distance greater than the height of the container when the container lies flat upon the base support member, but less than the height of the container when the container is tilted upward from the base support member, said top guide further having a length sufficiently less than the length of the base support member to allow one container to tilt upward for discharge from the rack; and
    a front stop bar disposed adjacent said container dispensing port, transverse to said base support member and vertically spaced therefrom.

4. The storage rack as recited in claim 3 wherein the base support member comprises a plurality of wire rods.

* * * * *